No. 732,911. PATENTED JULY 7, 1903.
G. N. ABBEY.
SKINNING KNIFE.
APPLICATION FILED FEB. 5, 1903.
NO MODEL.
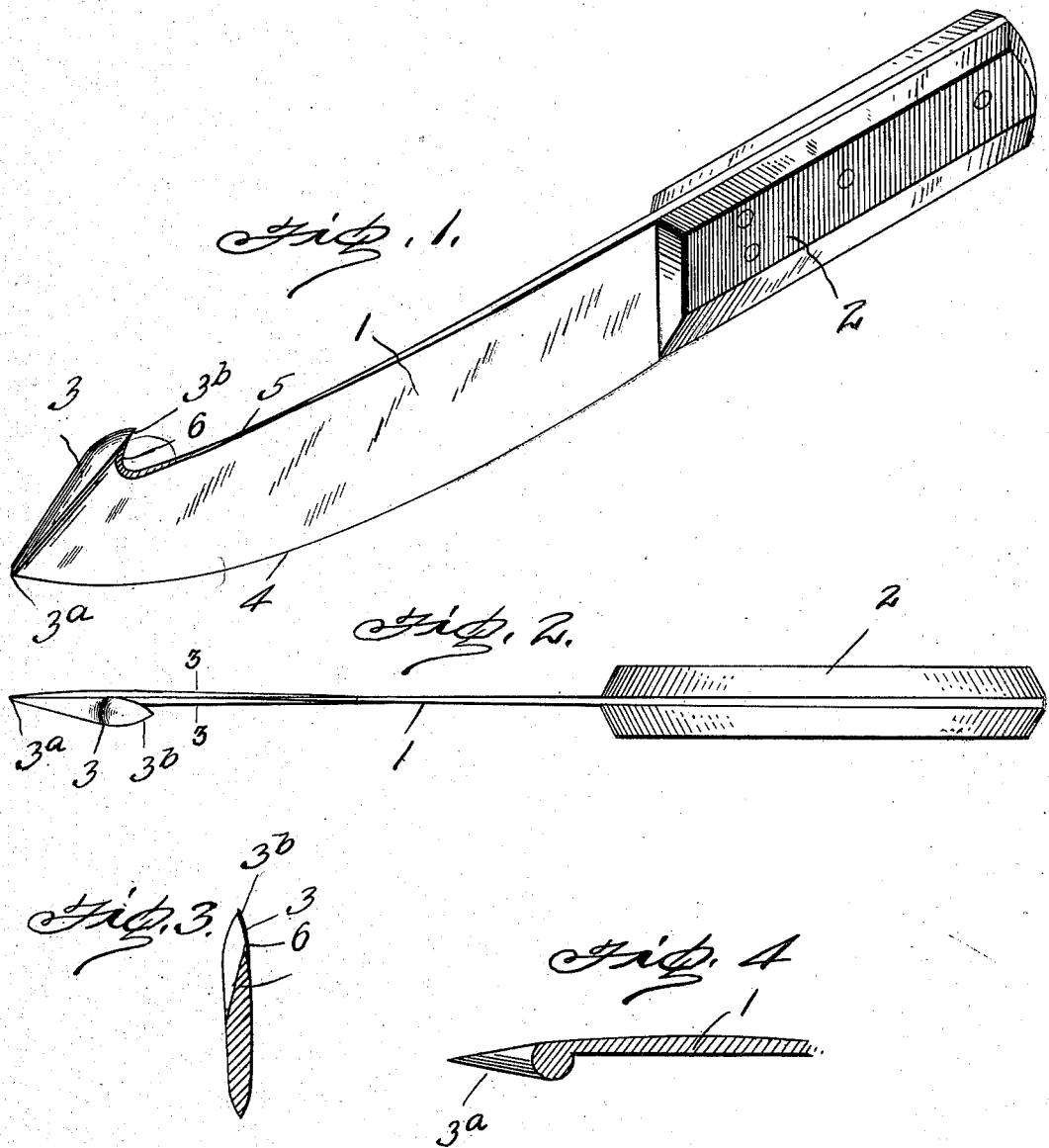
Inventor
Geo. N. Abbey.
Witnesses
Jas. A. G. Koehl.
L. Hilton.
By H. B. Wilson
Attorney No. 732,911. Patented July 7, 1903.

UNITED STATES PATENT OFFICE.

GEORGE N. ABBEY, OF UNION, OKLAHOMA TERRITORY.

SKINNING-KNIFE.

SPECIFICATION forming part of Letters Patent No. 732,911, dated July 7, 1903.

Application filed February 5, 1903. Serial No. 142,088. (No model.)

*To all whom it may concern:*

Be it known that I, GEORGE N. ABBEY, a citizen of the United States, residing at Union, in the county of Canadian, Oklahoma Territory, have invented certain new and useful Improvements in Skinning-Knives; and I do declare the following to be a full, clear, and exact description of the invention, such as will enable others skilled in the art to which it appertains to make and use the same.

This invention relates to improvements in butchers' skinning-knives, and is especially adapted for ripping and flaying the skin of beeves and other animals.

The object is to provide a knife for this purpose by which the skinning of an animal may be greatly expedited without liability of unduly cutting or tearing the skin or hacking the flesh of the animal.

With this and other objects in view the invention consists in the novel construction and arrangement of parts, as will be hereinafter more fully described and claimed, reference being had to the accompanying drawings, in which—

Figure 1 is a perspective view of a knife embodying my invention. Fig. 2 is a top plan view of the same. Fig. 3 is a vertical section through the blade on the line 3 3, and Fig. 4 is a longitudinal section through the end of the knife-blade.

In the drawings, 1 denotes the knife-blade, 2 the handle, and 3 a guard-hook formed on the end of the knife-blade. The blade 1 is curved and is sharp along the entire length of its convex edge 4, while the back or concave edge 5 is sharpened but a short distance from the end. The guard-hook 3 extends obliquely across the knife-blade and is formed on one side only of the same, but may be on either side, as desired, to form a right and left hand knife, the form shown in the drawings being that of a right-hand knife. A left-handed person would require the guard-hook formed on the opposite side of the blade. Therefore it is intended in practice to manufacture both forms. The guard-hook 3 is substantially conical in shape, the point 3ª of the same being at the lower point of the blade and increasing in size across the blade, forming a guard on the end of the same and projecting a short distance beyond the back of the blade to form a hook 3ᵇ, this end of the guard being rounded slightly toward the back of the knife, and the inner side of said projecting portion adjacent to the angle formed by the same and the back edge of the blade is sharpened or beveled to an edge, as shown at 6.

In practice when it is desired to skin an animal a small incision is made in the skin at one end of the carcass, and the hook or projecting end of the guard is inserted in the incision, the back of the blade being next to the hide. The knife is now drawn toward the operator and the skin ripped the entire length of the animal without removing the knife, the guard preventing the knife from cutting or tearing the flesh and enabling a straight even cut to be made in the skin. After the skin has been ripped the knife may be further used in flaying and peeling the same from the carcass, the guard acting as a shield and greatly aiding in this operation and effectually preventing cutting the skin or hacking the flesh.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A knife-blade having a cutting edge and a guard on the outer end of the blade, projecting laterally from one side thereof, said guard having a hook projecting beyond said cutting edge, substantially as described.

2. A butcher-knife having sharp convex and concave edges, and a conical-shaped guard formed obliquely across one side and at the end of said blade and projecting beyond said concave edge to form a hook, substantially as described.

3. A knife-blade having front and rear cutting edges and provided at its outer end with a guard projecting laterally from one side thereof, said guard having a hook projecting beyond the rear cutting edge of the blade, substantially as described.

4. A knife-blade having front and rear cutting edges and provided at its outer end with a guard projecting laterally from one side thereof, said guard tapering from the front outer corner of the blade toward the rear edge thereof, and having a reversely-tapered hook projecting beyond the rear cutting edge of the blade, substantially as described.

In testimony whereof I have hereunto set my hand in presence of two subscribing witnesses.

GEORGE N. ABBEY.

Witnesses:
D. P. RICHARDSON,
V. W. FAKER.